No. 755,635. PATENTED MAR. 29, 1904.
G. & H. P. DILLIG.
TRANSMISSION MECHANISM.
APPLICATION FILED MAY 8, 1903.

NO MODEL. 2 SHEETS—SHEET 1.

Witnesses:

Inventors.
George Dillig.
Henry P. Dillig.
By J. N. Cooke
Attorney

No. 755,635. PATENTED MAR. 29, 1904.
G. & H. P. DILLIG.
TRANSMISSION MECHANISM.
APPLICATION FILED MAY 8, 1903.
NO MODEL. 2 SHEETS—SHEET 2.

Witnesses:

Inventors.
George Dillig,
Henry P. Dillig,
By J. N. Cook
Attorney.

No. 755,635. Patented March 29, 1904.

UNITED STATES PATENT OFFICE.

GEORGE DILLIG AND HENRY P. DILLIG, OF MILLVALE, PENNSYLVANIA

TRANSMISSION MECHANISM.

SPECIFICATION forming part of Letters Patent No. 755,635, dated March 29, 1904.

Application filed May 8, 1903. Serial No. 156,163. (No model.)

*To all whom it may concern:*

Be it known that we, GEORGE DILLIG and HENRY P. DILLIG, both residents of Millvale borough, in the county of Allegheny and State of Pennsylvania, have invented a new and useful Improvement in Transmission Mechanism; and we do hereby declare the following to be a full, clear, and exact description thereof.

Our invention relates to a transmission mechanism, and has special reference to such devices as are used upon motor-vehicles.

The object of our invention is to provide a cheap and simple form of a transmission mechanism which can be applied to the axle of the vehicle, so as to transmit the power of the motor to the wheels on said axle and allow either wheel to have motion when the vehicle is turning a corner or making a curve, when either wheel may slip and move at a velocity to suit the radius of the circle it describes without being controlled or restrained by the other wheel.

Our invention consists in the novel arrangement, construction, and combination of parts, as hereinafter more specifically set forth and described, and particularly pointed out in the claims.

To enable others skilled in the art to which our invention appertains to construct and use our improved transmission mechanism, we will describe the same more fully, referring to the accompanying drawings, in which—

Figure 1:
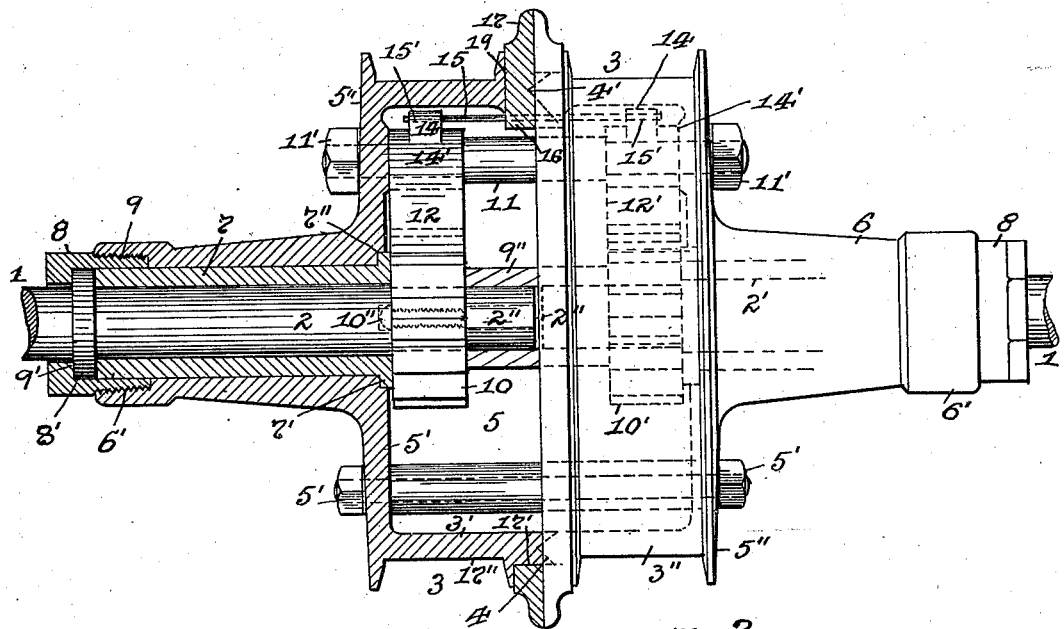
Figure 2:
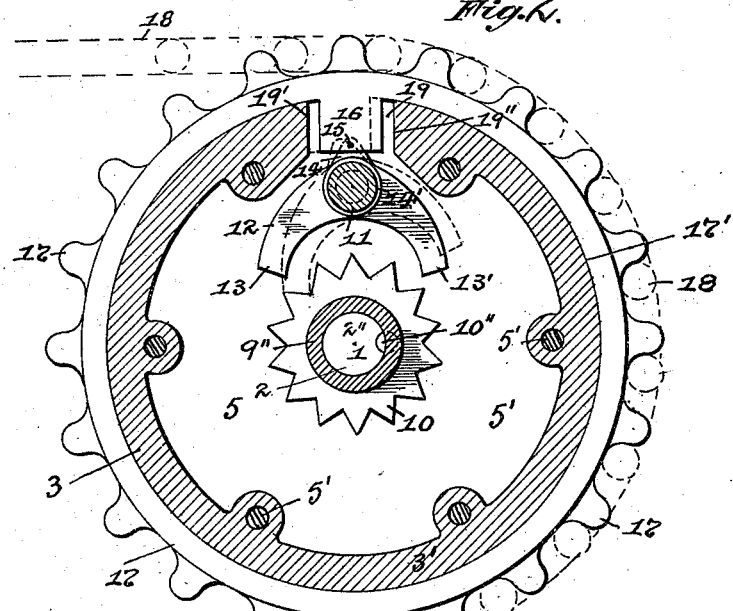
Figure 3:
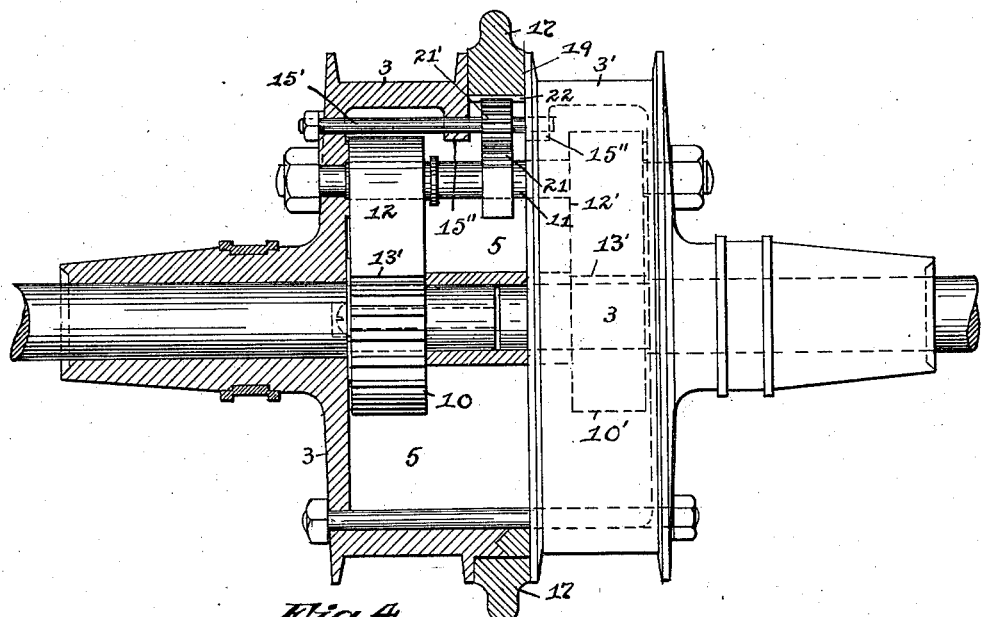
Figure 4:
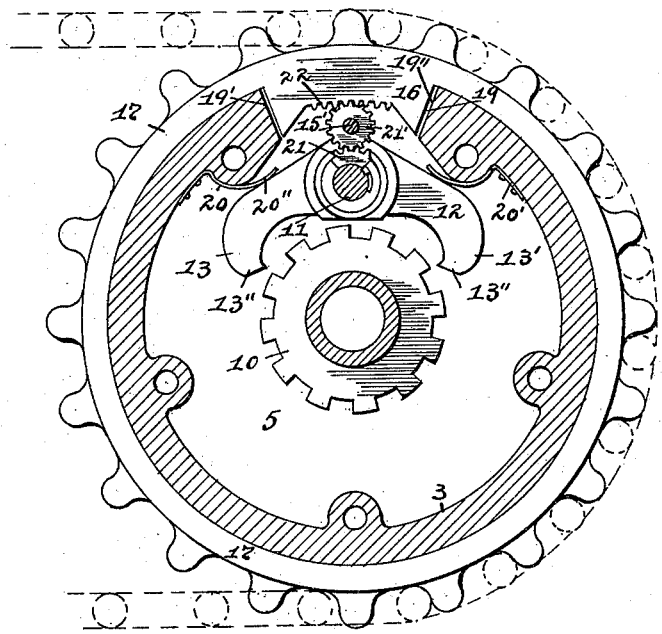

Figure 1 is a side view, partly in section, of our improved transmission mechanism. Fig. 2 is a central cross-section thereof, and Figs. 3 and 4 are like views of another form of such gear.

Like symbols of reference herein indicate like parts in each of the figures of the drawings.

As illustrated in the drawings, 1 represents the rear axle of the vehicle, which is made in two sections 2 2' and upon each end of which a wheel (not shown) is mounted and secured for carrying and driving the vehicle. The two sections 2 2' are held together by means of the casing 3, which is formed in two sections 3' 3" and surrounds the meeting or inner ends 2" of the said axle-sections. The meeting edges 4 of the casing-sections 3' 3" are provided with the angular tongue-and-groove joints 4', and such sections in forming the casing 3 provide for the internal chamber 5 and are held together by means of the bolts 5', passing through the same. Extending out from each side of the sections 3' 3" are the sleeves 6, which are provided with the threaded sockets 6' at their ends and are adapted to fit around bushings 7, secured on the axle-sections 2 2', such bushings 7 being provided with an annular flange 7' on the inner end thereof for fitting within a seat 7" on the inner faces 5' of the casing-sections 3' 3". The axle-sections 2 2' are each provided with an annular flange 8' thereon, which is adapted to fit against the outer end of the bushings 7, and over and against these flanges 8' a plug 8 is placed, which is adapted to have its threaded end 9 engage with the threaded socket 6' on the hubs 6, and its inner projecting flanges 9' rest against the flanges 8' around the axle-sections 2 2'.

On the inner ends of each of the bushings 7 and within the chamber 5 are the gear or ratchet wheels 10 10', which are adapted to be secured to said axle-sections 2 2' by means of a set-screw 10" and held in place against the flanges 7' on said bushings and a filling-sleeve 9", fitting around the ends 2" of said axle-sections 2 2" between the ratchet-wheels 10 10'.

Mounted loosely upon a bolt or pin 11, extending across the chamber 5 and held by the nuts 11' against the outer faces 5" of the casing-sections 3' 3", are the pawls 12 12', which are provided with the double-pointed ends 13 13' thereon and with the lugs 14 adjacent to the bearings 14' thereof around the pin 11. A rod 15 fits within an opening 15' in each of said lugs 14, and such rod extends across said chamber 5 and through a lug or projection 16, formed on the sprocket-wheel 17, which carries the sprocket-chain 18 around the same from the driving mechanism. This sprocket-wheel 17 fits loosely around and within an annular recess or seat 17', formed in the outer face 17" of the casing-sections 3' 3", and the projection 16 on said wheel 17 extends through an opening 19, formed in said sections 3' 3" at the meeting edges 4 thereof and extending from the seat 17' into the chamber 5, so as to provide for the stops or end faces 19' 19" therein.

The use and operation of our transmission mechanism is as follows: When the vehicle is going forward in a straight line, the strain on the driving-chain 18 around the sprocket-wheel 17 will act to so draw the projection 16 on said wheel that it will strike against the end face 19' of the opening 19 and so tilt the pawls 12 12' by means of the rod 15, connecting said projection 16 with the lugs 14 on said pawls, which will cause the opposite ends 13 on each of said pawls 12 12' to so engage the ratchet-wheels 10 10', thereby revolving the two sections 2 2' of the axle 1 and moving the vehicle forward. When the vehicle is going backward in a straight line, the projection 16 will strike against the end face 19' of said opening 19, and so tilt the pawls 12 12', connected to said projection, in the opposite direction from that of going forward, which will cause the opposite ends 13' on each of the said pawls to engage the ratchet-wheels 10 10', and thereby revolving the two sections 2 2' of the axle 1 to move the vehicle backward. In the case of making a curve or in turning a corner in going ahead, which of course allows the outside wheel on the axle 1 to travel faster than the inside wheel on said axle—as, for instance, the wheel on the section 2' of said axle in moving forward—the strain on the sprocket-wheel 17 from the chain 18 will cause the projection 16 to strike against the end 19' of said opening 19. As soon as the projection 16 has struck the said end 19' it will act to tilt the pawls 12 12' by means of the rod 15, connecting said projection with the lugs 14 on said pawls, thereby enabling the end 13 on the pawl 12 to bind more tightly on the ratchet-wheel 10 around the inside section 2 of the axle, which will allow the pawl 12' for engaging the ratchet-wheel 10' on the outside section 2' of said axle 1 to entirely free itself from said wheel 10', and so permit the wheel on this outside section 2' and with the same to travel faster than the inside portion 2 with its wheel thereon. When the wheel on the section 2 is the outside wheel, in making a curve or in turning a corner and in going ahead the strain on the sprocket-wheel 17 from the chain 18 will cause the projection 16 to strike against the other end face 19" of the opening 19, and so tilt the pawls 12 12' through the rod 15 on the said projection connecting the lugs 14 on said pawls. As the pawls 12 12' are thus tilted it will cause the end 13 on the pawl 12' to bind more tightly on the ratchet-wheel 10' around the inside section 2' of the axle 1 and allow the pawl 12 for engaging the ratchet-wheel 10 on the outside section 2 to entirely free itself from said wheel 10, and so permit the wheel on and with this outside section 2 to travel faster than the inside portion 2' and its wheel thereon. In going backward and in making a curve or in turning a corner the operations are repeated, as above described, except that the ends 13' on the pawls 12 12' engage with the ratchet-wheels 10 10' instead of the ends 13 thereon.

In Figs. 3 and 4 we have shown another form of our improved transmission mechanism in which flat toothed gear-wheels are shown instead of the sharp toothed ratchet-wheels 10 10', and in this case the ends 13 13' of the pawls 12 12' are provided with inwardly-turned portions 13" for engaging with the flat toothed gear-wheels, while the engaging ends on said pawls are adapted to be held in place in said wheels by means of the springs 20, secured to the interior chamber 5 of the casing 3 at one end, as at 20', and their opposite ends 20" being held in contact with said pawls. The pin 11 for holding said pawls is provided with a segmented gear-wheel 21 thereon, which is adapted to mesh with a pinion 21' on the rod 15', extending across said chamber 5 and through lugs 15", extending down into said chamber from the sections 3' 3". The pinion 21' is held between said lugs 15" and is adapted to mesh with a rack 22, formed on the projection 16, extending through the opening 19 in the casing from the sprocket-wheel 17, so that the strain in moving said wheel and the projection 16 in striking the ends 19' 19" of said opening 19 will cause the rack 22 to revolve said pinion 21', which, meshing with the gear 21, will act to tilt said pawls and cause the ends thereof to engage the gear or ratchet wheels according to the direction of the movement of the vehicle or the wheels in going ahead, backward, or in making a curve or in turning a corner, in going ahead or backward, as described.

Various other modifications and changes in the construction and design of the various parts of our improved transmission mechanism may be resorted to without departing from the spirit of the invention or sacrificing any of its advantages.

It will thus be seen that our improved transmission mechanism contains few parts and the operation will always be quick and positive.

The device is strong and durable and being automatic in its action and operation will require no manual handling by means of levers, clutches, gears, rods, &c., as in the ordinary devices of this kind.

What we claim as our invention, and desire to secure by Letters Patent, is—

1. In a transmission mechanism, the combination of a shaft or axle formed in two sections, a casing around the ends of said sections, a sprocket-wheel loosely mounted on said casing and adapted to be operated by a chain from the driving mechanism, and means connecting said axle-sections and sprocket-wheel for revolving both or either of said sections.

2. In a transmission mechanism, the combination of a shaft or axle formed in two sections, a casing around the ends of said sections, a sprocket-wheel loosely mounted on said casing and adapted to be operated by a chain from the driving mechanism, ratchet-wheels secured on the ends of said sections and within said casing, and means connecting said ratchet-wheels and sprocket-wheel for revolving both or either of said sections.

3. In a transmission mechanism, the combination of a shaft or axle formed in two sections, a casing around the ends of said sections, a sprocket-wheel loosely mounted on said casing and adapted to be operated by a chain from the driving mechanism, ratchet-wheels secured on the ends of said sections and within said casing, double-pointed pawls mounted within said casing, and means connecting said pawls and the sprocket-wheels for tilting said pawls to engage said ratchet-wheels and revolve both or either of said sections.

4. In a transmission mechanism, the combination of a shaft or axle formed in two sections, a casing around the ends of said sections, a sprocket-wheel loosely mounted on said casing and adapted to be operated by a chain from the driving mechanism, said sprocket-wheel having a lug or projection thereon adapted to extend through an opening in said casing and engage with the faces of the same, ratchet-wheels secured on the ends of said sections and within said casing, double-pointed pawls mounted within said casing, and means connected to said projection and to said pawls for tilting the said pawls to engage said ratchet-wheels and revolve either or both of said sections.

5. In a transmission mechanism, the combination of a shaft or axle formed in two sections, a casing around the ends of said sections, a sprocket-wheel loosely mounted on said casing and adapted to be operated by a chain from the driving mechanism, said sprocket-wheel having a lug or projection thereon extending through an opening in said casing, ratchet-wheels secured upon the ends of said sections and within said casing, and double-pointed pawls mounted within said casing and connected to said projection and said projection being adapted to engage with the end faces of said opening to form stops to tilt said pawls and allow them to engage said ratchet-wheels to revolve either or both on said sections.

6. A transmission mechanism, comprising a shaft or axle formed in two sections, a casing around the ends of said sections, a sprocket-wheel mounted on said casing and adapted to be operated by a chain from the driving mechanism, said sprocket-wheel having a lug or projection thereon adapted to extend through an opening in said casing and engage with the faces of the same, ratchet-wheels secured on the ends of said sections and within said casing, double-pointed pawls mounted within said casing, and means connecting said ratchet-wheels and sprocket-wheel for revolving both or either of said sections.

7. In a transmission mechanism, the combination of a shaft formed in two sections, a casing around the ends of said sections, a sprocket-wheel loosely mounted on said casing and adapted to be operated by a chain from the driving mechanism, said sprocket-wheel having a lug or projection thereon adapted to extend through an opening in said casing and engage with the faces of the same, ratchet-wheels secured on the ends of said sections and within said casing, double-pointed pawls mounted within said casing, means connected to said pawls for tilting said pawls to engage said ratchet-wheels and revolve either or both of said sections, and springs connected to said casing and engaging with said pawls for holding them in position for operating.

In testimony whereof we, the said GEORGE DILLIG and HENRY P. DILLIG, have hereunto set our hands.

GEORGE DILLIG.
HENRY P. DILLIG.

Witnesses:
J. N. COOKE,
A. J. SCHLERETH.